March 27, 1951 H. H. MUELLER 2,546,470

PHONOGRAPH RECORD ALBUM

Filed Jan. 14, 1949 2 Sheets-Sheet 1

Herman H. Mueller
INVENTOR.

BY Clarence A. O'Brien
and Harvey B. Jacobson
Attorneys

March 27, 1951 H. H. MUELLER 2,546,470

PHONOGRAPH RECORD ALBUM

Filed Jan. 14, 1949 2 Sheets-Sheet 2

Herman H. Mueller
INVENTOR.

BY Clarence A. O'Brien and Harvey B. Jacobson
Attorneys

Patented Mar. 27, 1951

2,546,470

UNITED STATES PATENT OFFICE 2,546,470

PHONOGRAPH RECORD ALBUM

Herman H. Mueller, Ephrata, Pa., assignor of one-fourth to George L. Bowman, Ephrata, Pa., and one-eighth to John L. Bowman, Denver, Pa.

Application January 14, 1949, Serial No. 70,974

8 Claims. (Cl. 206—62)

This invention comprises novel and useful improvements in a phonograph record album and more particularly pertains to a construction which is adapted to lock a plurality of record discs together.

The primary object of this invention is to enable a plurality of record discs to be retained and stored in a secure and protective manner, whereby the records will retain their original and true shape and warping thereof will be obviated.

Another important object of this invention is to retain a plurality of record discs in a safe manner so that the records are protected against breakage and destruction and are retained with their adjacent surfaces protectively spaced to prevent slippage of one disc upon another.

The most important aim of the instant invention resides in devising a record album wherein a plurality of records are locked in a stacked formation so that regardless of the position in which the album is placed, the records will be prevented from falling out of the album.

Another important purpose of the instant invention resides in providing a record album which will store a plurality of records in a protective manner to prevent warping thereof and will cause warped record discs to assume their original and true shape.

Yet another very important purpose of the invention resides in providing a construction in conformity with each of the preceding objects which is capable of retaining in a locked fashion a plurality of record discs, the adjacent surfaces of the discs being protected and the discs being retained by the album in such a manner so as to permit the removal of all of the records at one time and the placing of all of the records as an entire set on a phonograph record changer and player.

Still another important purpose of the instant invention comprehends the provision of a construction wherein an upright pin or spindle is carried by one of the cover sections of the album for engaging the customarily provided centrally disposed aperture in a conventional record disc and thereby retain a plurality of discs in a stacked formation, means being provided for locking the record discs on the spindle for storage purposes and means being provided for preventing accidental withdrawal or falling of the records, regardless of the position in which the album is placed.

These, together with various ancillary supplemental objects of the instant invention, which will later become apparent as the following description proceeds, are attained by this invention, a preferred embodiment of which is illustrated by way of example in the accompanying drawings, wherein.

Figure 1:
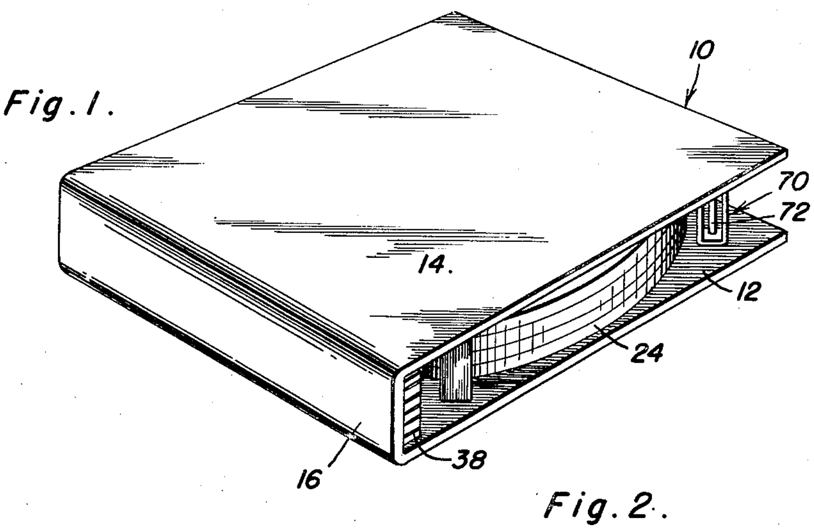
Figure 1 is a view in perspective of a phonograph record album, constructed in accordance with the principles in the invention.
Figure 2:
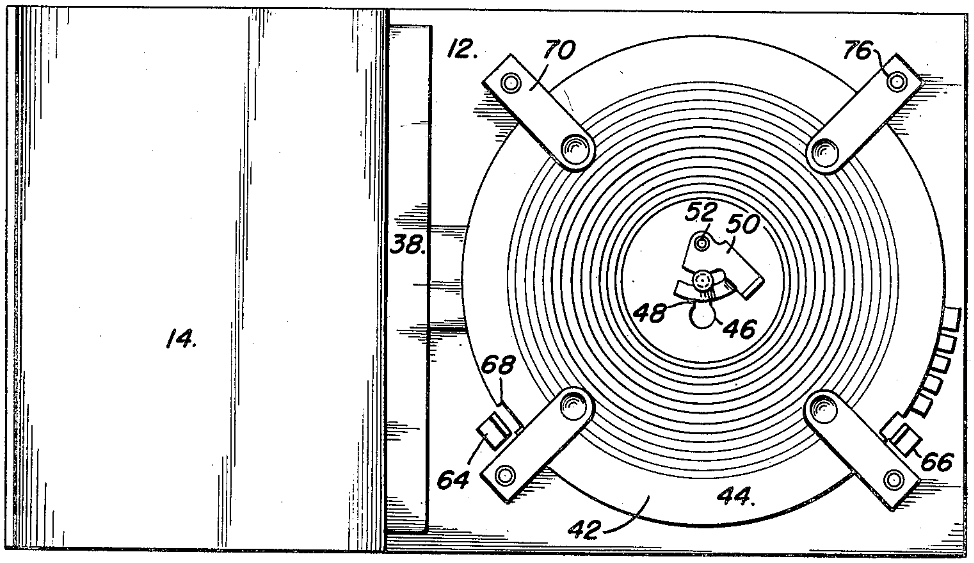
Figure 2 is a plan view of the album in an opened position illustrating the means provided for locking the record discs within the cover sections.
Figure 7:
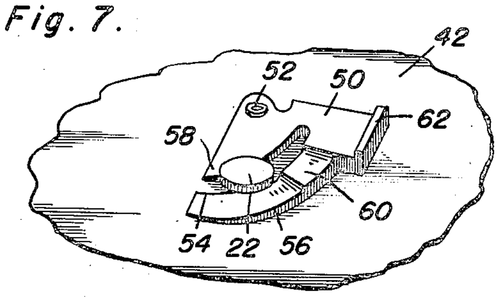
Figure 7 is a detail perspective view of the means provided for locking the record discs on an upright pin carried by one of the cover sections.
Figures 3, 4:
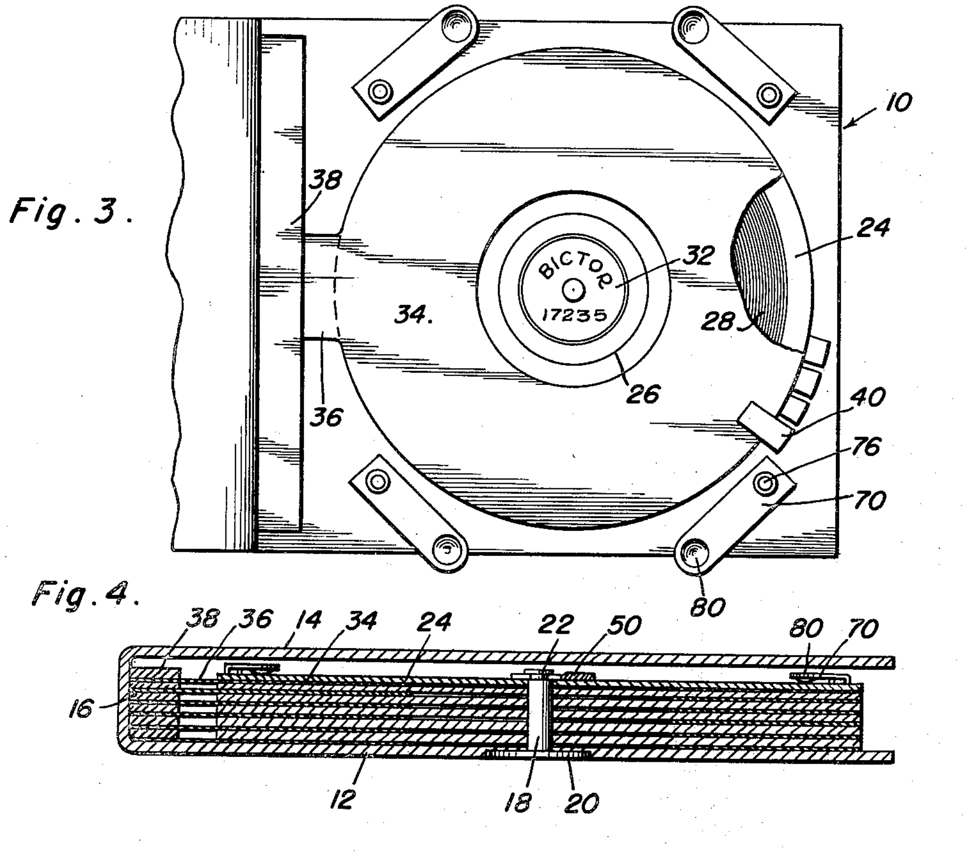
Figure 3 is a detail plan view of one of the cover sections of the album, with the locking member removed and a bracket turned to an inoperative position.
Figure 4 is a vertical sectional view taken centrally through the album, the same being disclosed in a closed position.
Figure 5:
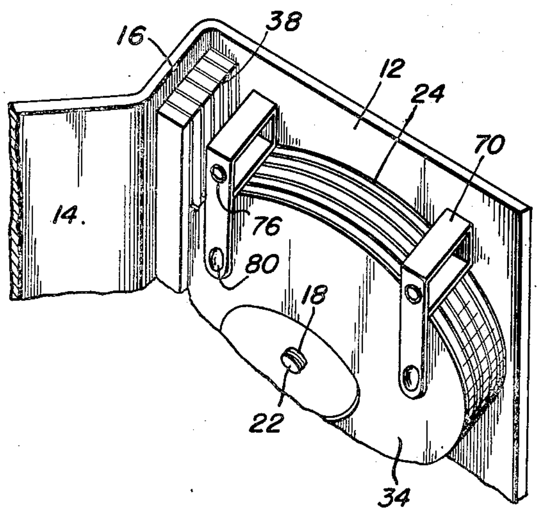
Figure 5 is a fragmentary perspective view of the album in an opened vertical position.
Figure 6:
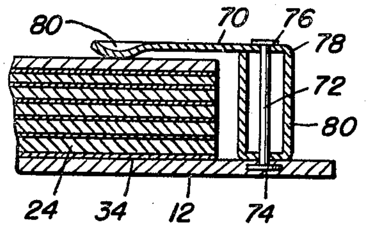
Figure 6 is a detail sectional view of one of the safety levers or locking pins.

It is well known that despite the most careful attention, records of molded plastic composition frequently become slightly warped and, when played in such a condition, the original and true tenor of the message or sound impressed thereon is distorted and eventually, the record is rendered completely worthless. Thus, the fundamental purpose of this invention resides in providing a phonograph album with an adjustable locking device for exerting pressure upon a plurality of stacked record discs and thereby pressing warped discs back into their original shape and preventing record discs from becoming warped, regardless of climatic conditions. To further prolong the life of a record and enhance the fidelity of its tone reproduction, the record album of the instant invention is provided with safety means for preventing accidental slipping and dropping of a record from the album, regardless of the position in which the album is placed.

Therefore, it can be appreciated that this invention will be useful for the purpose of storing phonograph record discs when not in use or for shipping the same, and also, for retaining the discs in a protected and dependable manner by preventing accidental removal of the discs and by keeping the discs level and flat, all of the foregoing combining to prolong the life of a record and enhance and increase the efficiency thereof.

Referring now more particularly to the accompanying drawing, the novelly designed and constructured record album 10 includes a back cover section 12 and a front cover section 14 hingedly associated therewith by means of a binding strip 16. The front and back cover sections may be made of heavy cardboard or suitable firm material and may be reinforced by level steel sheetings or metal stampings, having their outer surfaces covered with suitable protective material, such as felt or the like. The elongated strip 16 may be formed integral with the back section 12 and extends laterally from the inner marginal edge thereof, the upper or unattached end of the strip being hingedly associated with the inner end of the front section 14 by binding in a manner well known in the art. Thus, the front and back sections may be hingedly associated or connected together in any well known and conventional manner and may be reinforced in any desired manner. Of course, the front section 14 may be formed merely of cardboard without any reinforcing member but it is preferred that the bottom section 12 be reinforced, inasmuch as the same is adapted to function as a stationary pressing or clamping member.

In the latter respect, a pin or shaft 18 is adapted to extend vertically from the center point of the bottom section and is provided with an enlarged disc-like head 20 embedded in the bottom section at the center thereof. The upper extremity of the pin terminates in a slightly enlarged head 22. The height of the pin is preferably substantially equal to the height of the strip 16, the height of both the strip and the pin or shaft depending upon the number of records to be stored or placed in a particular album, constructed according to this invention. The head 22 of the pin would be small enough to be easily inserted through the conventionally centrally disposed aperture in a record disc 24, the centrally apertured circular portion 26 of the record being surrounded by a portion 28 having the spirally disposed sound track thereon. Identifying labels 32 are conventionally secured on the circular portion 26.

Thus, a plurality of record discs would be positioned in stack formation on the inner surface of the bottom section 12, the records being inserted on the pin 18. A plurality of paper protector members, such as the annular or ring like protector 34 are provided for insertion between the adjacent surfaces of the stacked records to protect the sound track 28 of each of the adjacent records. The spacing or protector members are formed with lateral attaching extensions 36 anchored to attaching members 38, which are secured at their inner longitudinal edges to the inner surface of the strip 16. Of course, tabs 40 may be secured on the spacing members and project radially therefrom, so that the same may be easily interposed between adjacent records and removed from engagement with the records, the spacing rings being turned downwardly upon the front section, when not in use. If desired, certain longitudinally spaced cut out portions may be formed in the anchoring strips 38, so that each strip may be inscribed with the title of the record that its contiguous spacing ring overlies for identifying the records stacked on the pin.

Means is provided for locking the stacked records on the pin and for exerting a pressure on the records to sustain the same in their flat level position and prevent warping thereof and also, to straighten out a warped record of conventional plastic molding composition. Any suitable rigid member may be positioned on the records and suitable locking means may be carried thereby for engaging the pin, the member constituting a detachable pressure plate cooperative with the stationary pressure or pressing plate defined by the back section 12. For example, a metal disc 42, of a diameter substantially similar to the standard record disc may be provided and is preferably formed with spirally disposed corrugations 44 for reinforcing the same and providing extra firmness to obviate any tendency of buckling or bending. The locking disc or plate 42 is provided with an eccentric vertical opening or slot 46 of a diameter larger than the head 22 of the pin, from which extends toward the center point of the disc a reduced opening 48. Thus, the disc is positioned on the pin by inserting the head of the pin through the enlarged opening 46 and sliding the disc until the shank of the pin is inserted in the reduced opening 48. A locking lever 50 is eccentrically pivoted as at 52 to the center portion of the locking disc and is formed with an arcuate slot 54 defined by an arcuate arm 56 and an opposing arcuate arm 58. The arm 56 has its upper face or surface formed with a series of stepped locking projections 60, the same being engageable under the head 22 of the shaft 18. A finger gripping section 62 extends upwardly from the locking lever, so that the same may be swung about its pivot point to receive the pin within the slot 54 and to lock the disc on the pin. Selected degrees of pressure may be exerted on the records by the detachable plate 42 and the back cover or stationary plate 12, due to the stepped locking surface 60 on the arm 56. Thus, it can be appreciated that the records will be maintained under constant pressure between the stationary and detachable plate and will be sustained in a flat and unwarped state or condition. Of course, recesses may be formed on the front cover section 14, on the inner surface thereof, for accommodating the corrugations or impressed surface on the top locking disc 42, so that the album will be folded flat when closed.

To enable the record discs 24 to be inserted on the pin 18 without scratching or marring or otherwise introducing attrition upon the sound track of the record, inserting stop means, such as a pair of angle members 64 and 66, may be mounted on the inner surface of the back cover. The angle members will, of course, be covered or coated with a soft material and may be stamped out of the foundation sheeting or stamping for the back section to eliminate the attaching of additional material. It can be appreciated that the records may be conveniently and safely inserted on the shaft by first aligning the central aperture thereof with the shaft, the record being temporarily held on the stop members 64 and 66. This will avoid a scratching of the records sound track by a record being placed in an overlying position thereon. The locking disc 42 may be provided with peripheral recesses 68 circumferentially spaced thereon and adapted to receive the stop members 64 and 66, so that the discs may be slided upon the pin 18. Without the provision of the peripheral recesses, any sliding movement of the disc would be prevented by engagement of the periphery thereof against the stop members.

The foregoing structure is adapted for use, especially the locking disc 42 and a locking means carried thereby engageable on the pin 18, in storing and shipping a plurality of records, so that the same will not be broken and will not become warped. However, when the album is employed to retain a plurality of records that are regularly played, it is desirable that means be provided for preventing accidental breakage of the records by dropping or sliding out of the albums between the cover sections. Therefore, means may be provided for retaining the records in a secure and safe manner regardless of the positions in which the album may be placed. It has been proposed that pivoted safety levers 70 be secured to the inner face of the bottom section to automatically and freely swing over the top record and thereby retain the stack of records securely on the shaft 18. Thus, shafts or spindles 72 are perpendicularly disposed on the bottom cover 12, having one edge 74 embedded or anchored therein with the opposing end or upper extremity peened over, as at 76. The locking lever 70 is formed from an elongated continuous bar having one end bent outwardly at right angles as at 78 to define a U-shaped attaching section 80. The shaft 72 is inserted through an aperture formed in the web of the U-shaped section 80 and an aperture (not shown) in the bar adjacent the transverse bend 78. Thus, the locking lever is journalled on the pin for swinging or pivotal movement inwardly to overlie the stack of records and outwardly, the levers being gravity actuated in their swinging movements. An indentation or recess 80 is formed in the extended unattached end of the lever for frictionally engaging and frictionally locking upon the upper surface of a record. Of course, the undersurface of the indentation may be coated or covered with suitable protective material so as not to injure or mar the soundtrack of the record, though the record will also be protected by the spacing ring 34.

It is to be noted that the locking levers assume a position adjacent to the corners of the back cover section, so that when the album is placed on its lower end in a vertical position, the bottom pair of levers would swing dwnwardly out of engagement with the records, while the upper levers will swing into engagement with the records. Thus, regardless of the position in which the album is placed, one of the levers will always be in locking engagement on the upper record in the stack.

It will be appreciated that there is provided a novel and useful album for retaining a plurality of phonograph records in a protected manner. Usefulness of the safety levers fastened on the pivots or pins and adapted to swing by their own weight into a position overlying the stack of records on the pin 18 can be appreciated, since at least one of the levers would be operative should the record album be opened and be held upside-down and placed in a vertical position. Thus, the safety levers function to prevent the records from falling out of the album and because of their free swinging action on their pivots will always fall to such a position as to hold the records in place regardless of the angle at which the album is held. Of course, by merely pushing the safety levers away from the records in an outward direction the records can be released. Further, when the locking disc or plate 42 is employed and is locked by means of the locking levers on top of the stack of records, the four safety levers may be employed to impart an additional pressure on the outside rim of the records by being pushed over the corrugated projections.

It can thus be seen that a novelly constructed album for phonograph records has been provided, the same including means for locking a plurality of records, so as to retain the same flat and prevent warping and additionally being provided with safety means for preventing accidental breakage of any of the record discs.

Of course, since other purposes of this invention will become apparent to those skilled in the art and certain changes in details of structure and assembly may be desirable, it is to be understood that it is not desired to limit the invention to the exact construction shown and described, but all suitable modifications and equivalents may be resorted to falling within the scope of the appended claims.

Having described the invention, what is claimed as new is:

1. A phonograph record album including a pair of hingedly connected cover members, a mounting post vertically positioned on the inner surface of one of said members for receiving a plurality of record discs and retaining them in a stacked formation, a locking plate adapted for disposition on the post and superimposed on the record discs and a locking lever pivotally carried by said plate for engaging said post whereby said plate is pressed upon the record discs and means for adjusting the pressure of the plate on the discs.

2. A phonograph record album comprising a pair of complementary cover members, a mounting post vertically disposed on the inner surface of one of said members for receiving a plurality of record disks disposed in stacked formation, spacing means interposed between the adjacent surfaces of said discs, a locking plate detachably mounted on the post and superimposed on said discs, a locking lever pivotally carried by the plate and lockingly engageable with said vertically disposed post.

3. A holder for disk-type phonograph records comprising a base, a mounting post vertically positioned on the base for receiving the records and retaining the records in stacked formation, a locking plate detachably mounted on the post and superimposed on the stacked records, a locking lever pivotally carried by the plate, and an enlarged head on the upper end of the post under which the lever is slidably movable for damping the plate on the records and locking the records on the base.

4. A holder for disk-type phonograph records comprising a base, a mounting post vertically positioned on the base for receiving the records and retaining the records in stacked formation, a locking plate detachably mounted on the post and superimposed on the stacked records, a locking lever pivotally carried by the plate, and an enlarged head on the upper end of the post under which the lever is slidably movable for damping the plate on the records and locking the records on the base, said lever including a member having an angular slot formed therein to receive the post and defining a pair of branches, the upper surface of one of the branches being beveled whereby the pressure of the plate on the records is adjustable.

5. A holder for disk-type phonograph records comprising a base, a mounting post vertically positioned on the base for receiving the records and retaining the records in stacked formation, a locking plate detachably mounted on the post and superimposed on the stacked records, a locking lever pivotally carried by the plate, and an enlarged head on the upper end of the post under which the lever is slidably movable for damping the plate on the records and locking the records on the base, and freely swingable arms carried by the base and arranged in a circle encompassing the peripheries of the records, said arms being disposed parallel to and spaced from the base to overlie the records.

6. A holder for disk-type phonograph records comprising a base, a mounting post vertically positioned on the base for receiving the records and retaining the records in stacked formation, a locking plate detachably mounted on the post and superimposed on the stacked records, a locking lever pivotally carried by the plate, and an enlarged head on the upper end of the post under which the lever is slidably movable for damping the plate on the records and locking the records on the base, and rotatable members vertically mounted on the base and arranged concentrically around the post to encompass the records, lateral extension arms on the upper ends of the members adapted to overlie the upper record in the stack.

7. A holder for disk-type phonograph records comprising a base, a mounting post vertically positioned on the base for receiving the records and retaining the records in stacked formation, a locking plate detachably mounted on the post and superimposed on the stacked records, a locking lever pivotally carried by the plate, and an enlarged head on the upper end of the post under which the lever is slidably movable for damping the plate on the records and locking the records on the base, rotatable members vertically mounted on the base and arranged in a circle concentric to the post, lateral extension arms on the upper ends of the members adapted to swingably overlie the records and engage on the upper record in the stack, said arms swinging inwardly relative to the post to overlie the stack of records upon vertical positioning of the base.

8. A phonograph record album including a pair of hingedly connected cover members, a mounting post vertically formed on the inner surface of one of the members for receiving a plurality of record disks and retaining the records in a stacked formation, a locking plate detachably positioned on the post and superimposed on the stacked record disks and means pivotally carried by said locking plate and engageable with said post for clamping the plate on the records and the records on the post.

HERMAN H. MUELLER.

REFERENCES CITED

The following references are of record in the file of this patent:

UNITED STATES PATENTS

| Number | Name | Date |
|---|---|---|
| 1,276,326 | Casper | Aug. 20, 1918 |
| 1,320,958 | Albrecht et al. | Nov. 4, 1919 |
| 2,446,641 | Daymon | Aug. 10, 1948 |

FOREIGN PATENTS

| Number | Country | Date |
|---|---|---|
| 96,692 | Switzerland | Nov. 1, 1922 |
| 237,403 | Great Britain | July 30, 1925 |